(12) United States Patent
Ricci et al.

(10) Patent No.: US 6,619,164 B1
(45) Date of Patent: Sep. 16, 2003

(54) HINGE CONNECTED CLAMSHELL LATHE

(75) Inventors: Donato L. Ricci, W8477-162$^{nd}$ Ave., Hager City, WI (US) 54014; Brent Place, Hager City, WI (US)

(73) Assignee: Donato L. Ricci, Hager City, WI (US)

( * ) Notice: Subject to any disclaimer, the term of this patent is extended or adjusted under 35 U.S.C. 154(b) by 0 days.

(21) Appl. No.: 10/279,327

(22) Filed: Oct. 24, 2002

(51) Int. Cl.$^7$ ................................................. B23B 5/08
(52) U.S. Cl. ......................................... 82/113; 82/128
(58) Field of Search ................ 82/113, 128; 30/95–101

(56) References Cited

U.S. PATENT DOCUMENTS

| | | | |
|---|---|---|---|
| 3,819,163 A | * | 6/1974 | Stunkard ..................... 82/113 |
| 4,063,355 A | * | 12/1977 | Netzel .......................... 30/96 |
| 4,402,136 A | * | 9/1983 | Rust ............................ 30/101 |
| 4,739,685 A | | 4/1988 | Ricci |
| 4,939,964 A | | 7/1990 | Ricci |
| 5,549,024 A | | 8/1996 | Ricci |

* cited by examiner

*Primary Examiner*—Willmon Fridie, Jr.
(74) *Attorney, Agent, or Firm*—Thomas J. Nikolai; Nikolai & Mersereau, P.A.

(57) ABSTRACT

Disclosed is a portable machining lathe for machining a pipe or similar workpiece. The lathe includes two semicircular members having a stationary section and a rotatable section. The two semicircular members are cooperatively connected by a hinge system on one end, and steel splice plates on the other. The hinge has a top bracket and bottom bracket on the stationary section of each member, and a male hinge and female hinge on the rotatable section of each member. The male and female hinges are cooperatively connected so that when the hinge is closed the two semicircular members form a complete annulus.

5 Claims, 5 Drawing Sheets

HINGE CONNECTED CLAMSHELL LATHE

BACKGROUND OF THE INVENTION

1. Field of the Invention.

This invention relates generally to a portable machining lathe, and more particularly a split frame clamshell-type portable machining lathe for cutting and finishing relatively large diameter pipes that has a hinge arrangement for joining two semicircular segments one to the other.

2. Description of the Prior Art.

Split frame clamshell lathes of the type described herein are known in the art. My earlier U.S. Pat. Nos. 4,739,685, 4,939,964, and 5,549,024 are illustrative of the technology involved. These patents are hereby incorporated by reference. As described in these three patents, the clamshell machining lathe generally comprises first and second semicircular segments that are designed to be joined together to form an annular assembly for encircling a shaft or pipe to be machined. The assembly includes a stationary ring, and a rotatable ring abutting the stationary ring. The rotatable ring includes a spur gear on its peripheral surface and is journaled to the stationary portion for rotation about a concentrically disposed pipe or shaft to be machined. A motor is attached to the stationary assembly and includes a drive gear designed to mesh with the spur gear on the rotatable segment of the pipe lathe. Also, a tool block for supporting a cutting tool is mounted on the rotatable segment. The cutting tool is adapted to be advanced in incremental steps in a radial direction against the pipe to be machined upon each orbit of the ring gear about the workpiece.

A problem has heretofore existed in the prior art in the manner in which the semicircular segments are connected to one another. In the past, splice plates have been used to connect the two pieces together. This has made set-up of the clamshell lathe on the workpiece difficult. Generally at least two workers are needed to mount the clamshell lathe onto the workpiece. They must simultaneously lift and hold the semicircular segments onto the workpiece while they bolt the clamping plates in place to join the mating ends of the semicircular segments to one another. It is the purpose of the present invention to simplify the initial set-up such that only a single person is required to perform the mounting operations.

SUMMARY OF THE INVENTION

The present invention comprises a portable machining lathe for machining a pipe or similar workpiece. The lathe includes two semicircular segments having a stationary section and a rotatable section. The two semicircular segments are cooperatively connected by a hinge system on one end, and steel spice plates on the other. The hinge on the stationary section of each has a top bracket and bottom bracket. On the rotatable section of each member there is a male hinge clamp and a female hinge clamp that are cooperatively connected such that when the hinge is closed, the two semicircular segments form a complete annulus. Splice plates cooperatively connect the non-hinged ends of the two semicircular segments A particular advantage of the present invention is that the lathe of the present invention is relatively portable. Furthermore, the substitution of an especially designed hinge for one of the sets of spice plates minimizes the manhandling and allows the lathe to be mounted on a cylindrical workpiece and operated by one person.

Another feature of the present invention is that the pipe lathe is capable of being affixed to the pipe in a relatively simple manner, and the operation of the lathe requires minimal time.

For a better understanding of the invention, and of the advantages obtained in its use, reference should be made to the drawings and the accompanying descriptive material, in which there is illustrated and described a preferred embodiment of the invention.

DESCRIPTION OF THE DRAWINGS

The foregoing features, objects and advantages of the invention will become apparent to those skilled in the art from the following detailed description of the preferred embodiment, especially when considered in conjunction with accompanying drawings in which like numerals in the several view refer to corresponding parts.

DESCRIPTION OF THE PREFERRED EMBODIMENT

Figure 1:
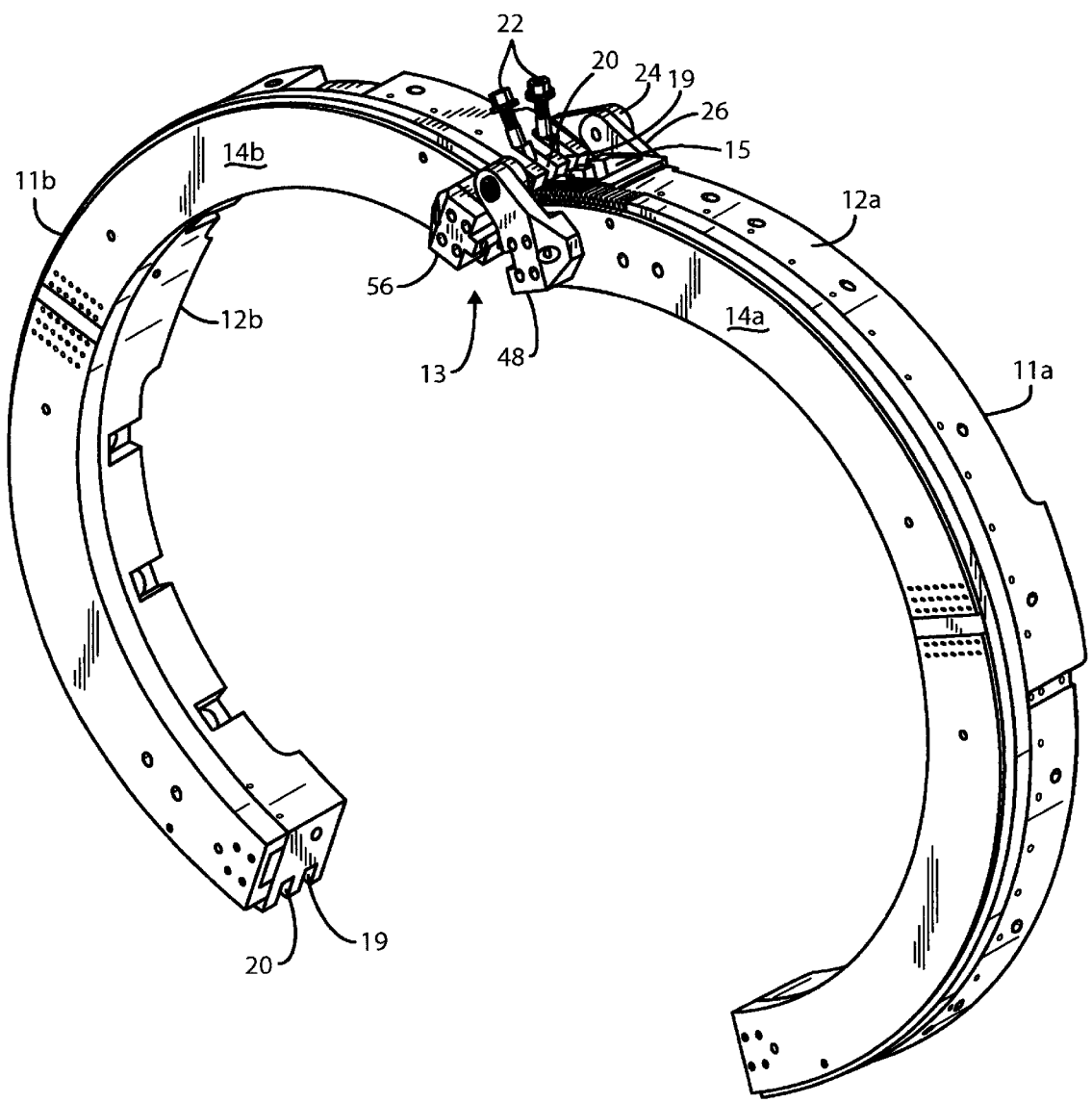
FIG. 1 illustrates a perspective view of a clamshell lathe constructed in accordance with the present invention.
Figure 2:
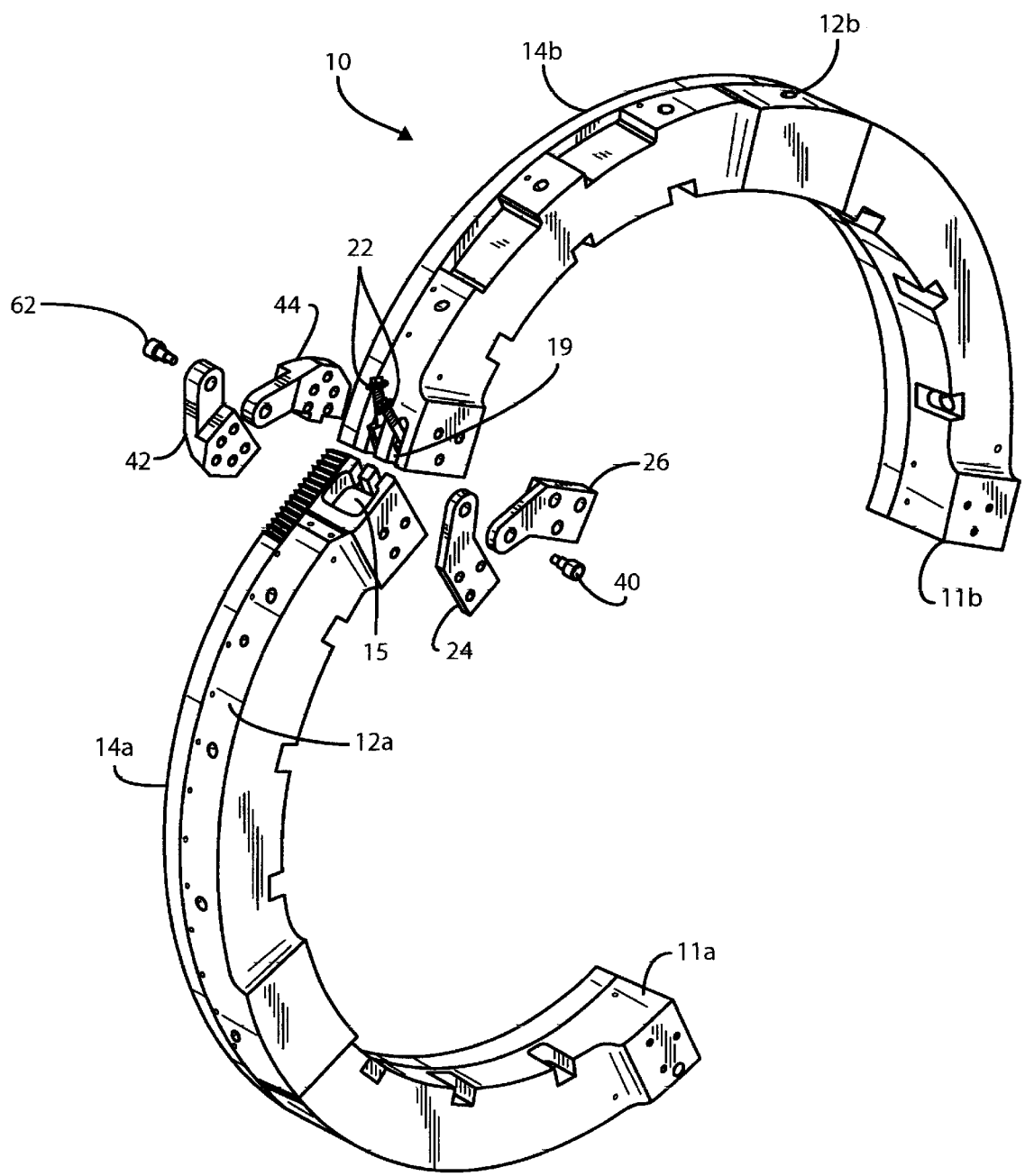
FIG. 2 shows an exploded perspective view of a hinged joint of the clamshell lathe.
Figure 3:
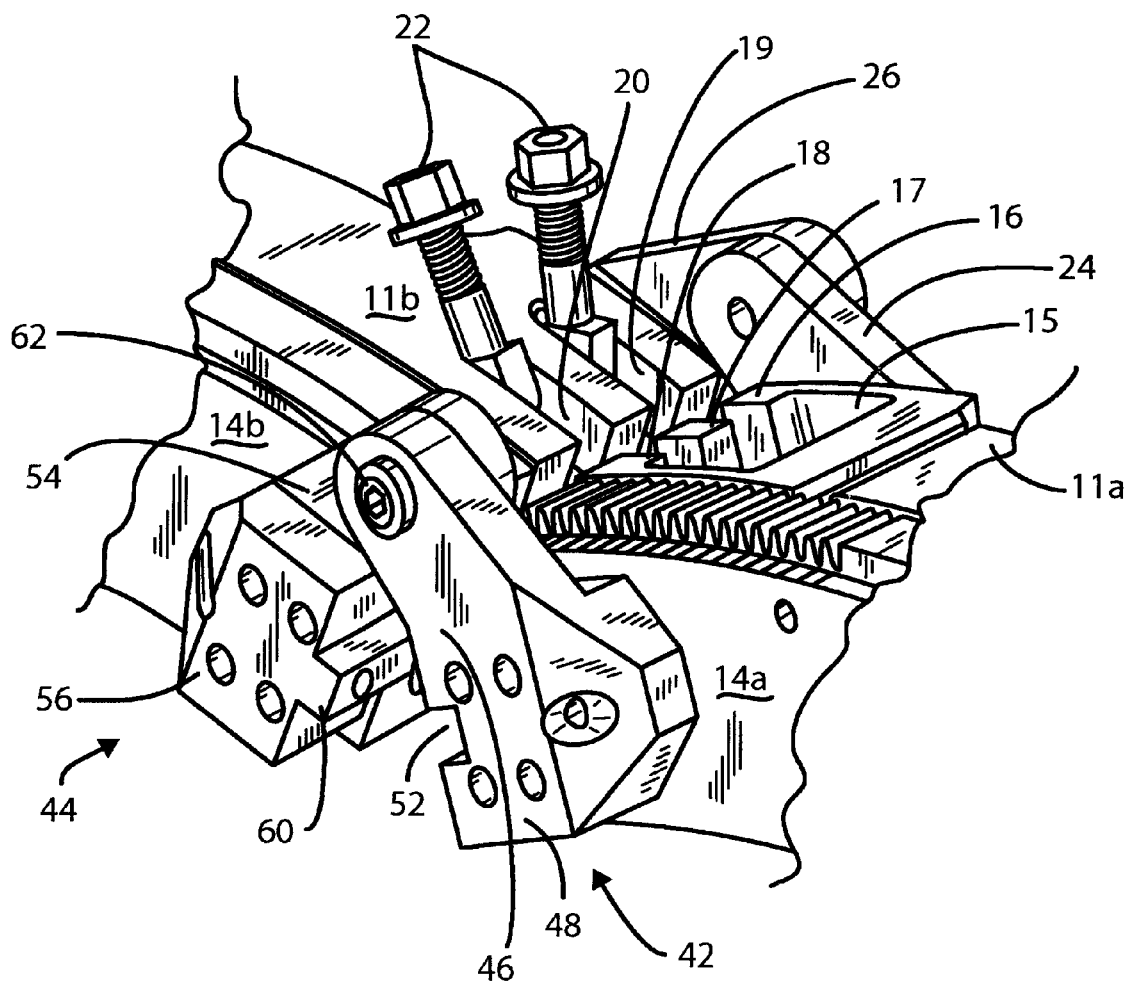
FIG. 3 shows an enlarged partial perspective view of the hinged joint.

Referring to the perspective view of FIG. 1 and the exploded view of FIG. 2., the clamshell lathe 10 incorporates two semicircular segments 11a and 11b that are joined together at one of the mating ends by a hinge assembly indicated generally by numeral 13. The semicircular segments 11a and 11b may be similar in construction to those described in the aforementioned U.S. Pat. No. 4,939,964 and it is unnecessary to describe their construction in detail, save to say that each comprises a stationary portion 12a and 12b and a rotational portion comprising a ring gear 14a and 14b. The two are joined together by bearings internal to the construction. As such, the rotatable portion can be made to spin about the central axis of the stationary member when the ring gear is driven by a motor driven drive gear.

Figure 6:
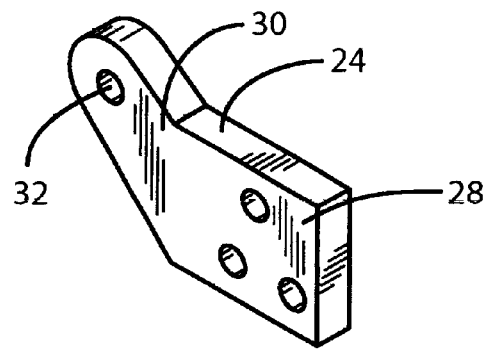
FIG. 6 is a perspective view of the top hinge bracket of the present invention.
Figure 7:
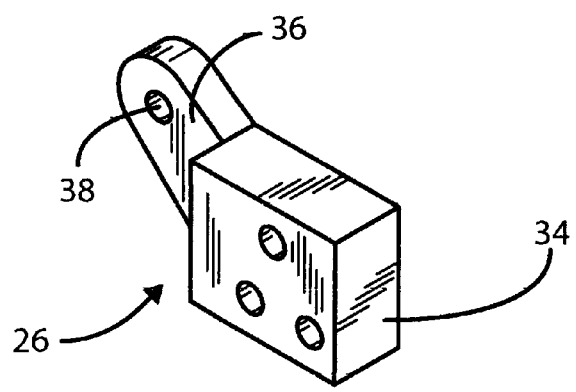
FIG. 7 is a perspective view of the bottom hinge bracket of the present invention.

In the prior art, it has been the practice to join the two semicircular segments 11a and 11b at opposed ends by swing bolts and splice plates so as to encircle the pipe or shaft to be machined. In accordance with the present invention, a hinge arrangement is used to join one end of each segment to the other. On the ends of one semicircular segment 11a there is a recess or socket 15 whose front wall 16 has a pair of slots 17, 18 extending perpendicularly from the periphery of the of the outer arcuate face of the stationary segment 12a. On the ends of the other stationary semicircular segment 12b there are two U-shaped notches 19, 20 formed inward from the outer arcuate face thereof. Pivotally mounted in the slots 19 and 20 are swing bolts 22, the purpose of which will be further explained as the description of the preferred embodiment continues. One stationary member 12a is connected to the second stationary member 12b by two brackets 24 and 26. The top bracket 24, as shown in FIG. 6, includes a mounting plate portion 28, a neck portion 30, and a pivot aperture 32 in the center of the neck portion 30. The mounting plate portion 28 is attached proximate to one end of the stationary half 12a of the first semicircular segment 11a. The bottom bracket 26 (FIG. 7) comprises a mounting plate portion 34, a neck portion 36, and a pivot aperture 38 formed therethrough. The mounting plate portion 34 is twice the thickness of the neck portion 36 and is adapted to attach to the stationary half 12b of the second semicircular segment 11b. The two brackets are then connected by a shoulder bolt 40 passing through the pivoting aperture 38 of the bottom bracket 26 and the pivoting aperture 32 of the top bracket 24. The stationary member 12a of the first semicircular segment 11a thus pivots with, and, when in a closed position, attaches to the stationary half 12b of the second semicircular segment 11b at the ends opposite from the hinge 13 to form an annular member.

Figure 4:
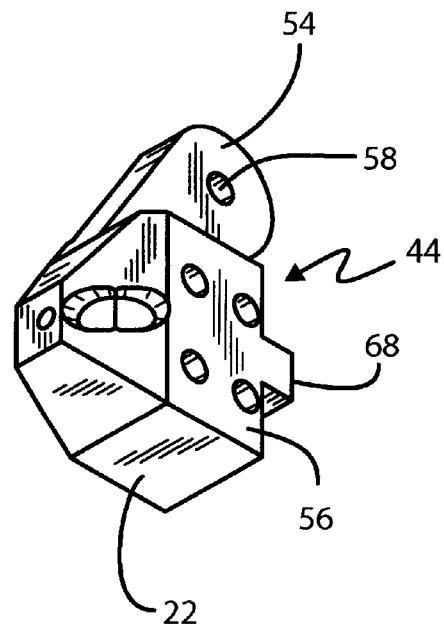
FIG. 4 is a perspective view of the male hinge member of the present invention.
Figure 5:
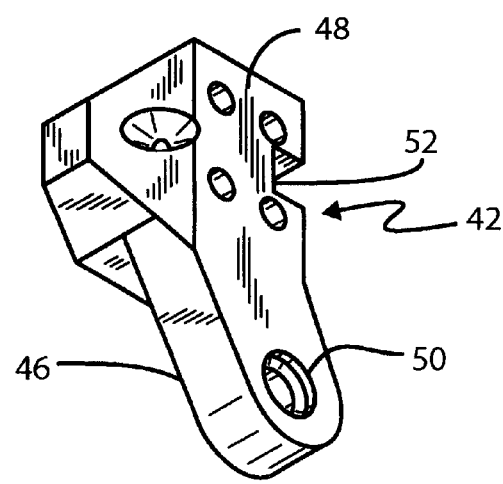
FIG. 5 is a perspective view of the female hinge member of the present invention.

Likewise, the rotatable member 14a of the first semicircular segment 11a is connected to the rotatable member 14b of the second semicircular segment 11b at the first end by two hinge members 42 (FIG. 5) and 44 (FIG. 4). More particularly, female hinge member 42 includes a pivoting arm 46 projecting from a mounting plate 48. A connecting aperture 50 is formed though an end of the arm 46. The mounting plate 48 of the female hinge member 42 includes a transversely extending notch 52 along the inner periphery thereof. The female hinge member 42 is attached to one end of the rotatable member 14a of the first semicircular segment 11a. It is positioned so that it is parallel with the top hinge bracket 24 and with the apertures 32 and 50 aligned with one another.

The male hinge member 44 includes a pivot arm 54 at one end, a mounting plate 56 at the opposite end thereof, and an aperture 58 formed through the arm. Protruding outward in a transverse fashion from the inner periphery of the of the male hinge member 42 is a key 60 designed to interface with the notch 52 of the female hinge member 42.

The female hinged member 42 is pivotally attached to the male hinge 44 by a shoulder bolt 62 which passes through the pivot aperture 50 of the female hinge member 42 and into a threaded pivot aperture 58 of the male hinge member 44, so that the two gear ring hinge members 42 and 44 can pivot on the shoulder bolt 62 as an axis. When the two semicircular segments 11a and 11b are placed in the closed position about a workpiece, the contacting key 60 of the male hinge member 44 interfaces with the notch 52 of the female hinge member 42 to provide registration of the two semicircular members so that they form an annular unit surrounding the pipe to be machined.

The two swing bolts 22 are placed at the back of the U-shaped notches 19 and 20. When the hinges are swung closed, the swing bolts 22 are rotated so that their heads swing into the notch 15 of the other semicircular segment 11a. When the bolts are tightened, the break between the spur gear teeth on gear ring halves 14a and 14b appear seamless.

Even though numerous characteristics and advantages of the invention have been set forth in the foregoing description, together with details of the structure and function of the invention, the disclosure is illustrative only, and changes can be made in detail, specially in areas of shape, size, and arrangement of parts, within the principles of the invention, to the full extent indicated by the broad, general meaning of the appended claims.

What is claimed is:

1. In a clamshell machining lathe having two semicircular segments where each semi-circular segment comprises a stationary member adapted to be secured to a cylindrical work piece to be machined and a movable member journaled for rotation on the stationary member and the movable member having spur gear teeth on an outer periphery thereof where the semi-circular segments each have first and second ends, the improvement comprising:
   (a) a first hinge assembly joining the stationary members at the first end having:
      (i) a first hinge member having an attachment plate adapted to be secured to the stationary member of the first semi-circular segment, an obliquely extending arm on the attachment plate, said arm having an aperture formed therethrough;
      (ii) a second hinge member having an attachment plate adapted to be secured to the stationary member of the second semi-circular segment and an obliquely extending arm projecting from the attachment plate of the second hinge member and a threaded bore formed in the arm thereof;
      (iii) a bolt passing through the aperture formed through the arm of the first hinge member into the threaded bore of the second hinge member;
   (b) a second hinge assembly joining the movable members at the first ends thereof;
   (c) means for releasable clamping the stationary and movable members to one another at their respective second ends thereof.

2. In a clamshell machining lathe having two semicircular segments where each semi-circular segment comprises a stationary member adapted to be secured to a cylindrical work piece to be machined and a movable member journaled for rotation on the stationary member and the movable member having spur gear teeth on an outer periphery thereof where the semi-circular segments each have first and second ends, the improvement comprising:
   (a) a first hinge assembly joining the stationary members at the first ends thereof;
   (b) a second hinge assembly joining the movable members at the first ends thereof, the said second hinge assembly having:
      (i) a female hinge member having a mounting plate adapted to be secured to the rotatable member of the first semi-circular segment including a transversely extending notch along the inner periphery of the mounting plate, a pivoting arm projecting from the mounting plate, said arm having an aperture formed therethrough;
      (ii) a male hinge member having a pivot arm, said pivot arm having a threaded bore formed therethrough, and a mounting plate adapted to be secured to the rotatable member of the second semi-circular segment where the mounting plate has a key protruding in a transverse fashion from the inner periphery at the mounting plate; and
      (iii) a bolt passing through the aperture formed through the arm of the female hinge member into the threaded bore of the male hinge member; and
   (c) means for releasably clamping the stationary and movable members to one another at their respective second ends thereof.

3. In a clamshell machining lathe having two semicircular segments where each semi-circular segment comprises a stationary member adapted to be secured to a cylindrical workpiece to be machined and a movable member journaled for rotation on the stationary member and the moveable member having spur gear teeth on an outer periphery thereof and where the semi-circular segments each have first and second ends, the improvement comprising:
   (a) a first hinge assembly joining the stationary members at the first ends thereof;

(b) a second hinge assembly joining the moveable members at the first ends thereof; and (c) means for releasably clamping the stationary and moveable members to one another at the respective second ends thereof; and (d) the stationary members each further including:

(i) a recess socket located at one end of the stationary member of the first semi-circular segment, the front wall of the socket having a pair of parallel slots extending therethrough;

(ii) two U-shaped notches extending inward from an outer arcuate face of the stationary member of the semi-circular segment; and (iii) swing bolts with a bolt head at one end thereof, the swing bolts being pivotally mounted in each U-shaped notch whereby the swing bolts may be rotated so that the swing bolt heads swing into the recessed socket through the parallel slots.

4. The clamshell machining lathe as in claim 1 where the stationary members of the two semi-circular segments each include:

(a) a recessed socket located at one end of the stationary member of the first semi-circular segment, the front wall of the socket having a pair of parallel slots extending therethrough;

(b) two U-shaped notches extending inward from an outer arcuate face of the stationary member of the second semi-circular segment;

(c) swing bolts with a bolt head at one end thereof, the swing bolts being pivotally mounted in each U-Shaped notch whereby the swing bolts may be rotated so that the swing bolt heads swing into the recessed socket though the parallel slots; and (d) the stationary members each further including:

(i) a recessed socket located at one end of the stationary member of the first semi-circular segment, the front wall of the socket having a pair of parallel slots extending therethrough; and (ii) two U-shaped notches extending inward from an outer arcuate face of the stationary member of the second semi-circular segment; and (iii) swing bolts with a bolt head at one end thereof, the swing bolts being pivotally mounted in each U-Shaped notch whereby the swing bolts may be rotated so that the swing bolt heads swing into the recessed socket though the parallel slots.

5. The clamshell machining lathe as in claim 2 where the stationary members each include:

(a) a recessed socket located at one end of the stationary member of the first semi-circular segment, the front wall of the socket having a pair of parallel slots extending therethrough;

(b) two U-shaped notches extending inward from an outer arcuate face of the stationary member of the second semi-circular segment; and c) swing bolts with a bolt head at one end thereof, the swing bolts being pivotally mounted in each U-Shaped notch whereby the swing bolts may be rotated so that the swing bolt heads swing into the recessed socket though the parallel slots.

* * * * *